US008638237B2

(12) United States Patent
Robaz et al.

(10) Patent No.: US 8,638,237 B2
(45) Date of Patent: Jan. 28, 2014

(54) VEHICLE AWARENESS SYSTEM

(75) Inventors: Gabi Charlie Robaz, Moshav Gizo (IL); Avner Ben-Zaken, Raanana (IL)

(73) Assignee: Janus Interface Ltd., Beer Sheva (IL)

( * ) Notice: Subject to any disclaimer, the term of this patent is extended or adjusted under 35 U.S.C. 154(b) by 468 days.

(21) Appl. No.: 12/936,492

(22) PCT Filed: Apr. 7, 2009

(86) PCT No.: PCT/IL2009/000391
§ 371 (c)(1),
(2), (4) Date: Oct. 5, 2010

(87) PCT Pub. No.: WO2009/125399
PCT Pub. Date: Oct. 15, 2009

(65) Prior Publication Data
US 2011/0032118 A1 Feb. 10, 2011

(30) Foreign Application Priority Data

Apr. 7, 2008 (IL) .......................................... 190674

(51) Int. Cl.
*G08G 1/00* (2006.01)
*B60Q 1/00* (2006.01)
*G08G 1/16* (2006.01)

(52) U.S. Cl.
USPC ........... 340/902; 340/903; 340/904; 340/432; 340/435; 701/300

(58) Field of Classification Search
USPC ................................................. 340/902, 903
See application file for complete search history.

(56) References Cited

U.S. PATENT DOCUMENTS

| 5,126,735 A | 6/1992 | Trevijano |
| 6,150,931 A | 11/2000 | Yamagata |
| 6,252,519 B1 | 6/2001 | McKenna |
| 6,700,504 B1 | 3/2004 | Aslandogan et al. |
| 6,731,202 B1 * | 5/2004 | Klaus .......................... 340/425.5 |
| 2003/0201906 A1 | 10/2003 | Buscemi |
| 2006/0255966 A1 | 11/2006 | McKenna |
| 2007/0139221 A1 | 6/2007 | Falvey |

FOREIGN PATENT DOCUMENTS

| DE | 100 33 859 A1 | 1/2002 |
| DE | 10 2004 027953 A1 | 3/2005 |
| FR | 2 790 858 A1 | 9/2000 |
| FR | 2 814 579 A1 | 3/2002 |

* cited by examiner

*Primary Examiner* — Donnie Crosland
(74) *Attorney, Agent, or Firm* — Marsteller & Associates, P.C.

(57) ABSTRACT

A vehicle awareness system for alerting the driver of a motor vehicle the approaching from the rear side of a motorcycle, and for reporting to the rider of the motorcycle that the driver of the motor vehicle has been alerted. The system comprises (a) a motorcycle unit, located on the motorcycle, for transmitting signals toward the traveling lane of that motorcycle; (b) a car unit, located in the motor vehicle, for receiving signals transmitted from the motorcycle unit, and accordingly supplying one or more output signals indicative of the approach of the motorcycle; (c) first warning means, activated by the output signals, for alerting the driver of the motor vehicle regarding the approach of the motorcycle from the rear side; and (d) second warning means, activated by the same output signals, for signaling the driver of the motorcycle that the first warning means are active.

4 Claims, 5 Drawing Sheets

VEHICLE AWARENESS SYSTEM

FIELD OF INVENTION

The present invention relates generally to vehicle safety by inter-vehicle communication systems. More particularly, the invention relates to a system for alerting drivers of motor vehicles (i.e. cars, trucks, and buses) of any moving vehicle (specifically motorcycle) that is approaching from the rear side.

BACKGROUND OF THE INVENTION

Unfortunately, high rates of motorcycle accidents occur because motorcycles, due to their narrow dimension and relatively fast motion, are unnoticeable. In particular, when a driver of a motor vehicle for any reason, changes lanes, without noticing that he is actually being overtaken by a motorcycle from the rear side (or any other vehicle approaching from the rear side). The sudden appearance of the motorcycle can be disorienting to the driver of the motor vehicle and much more dangerous for the driver of the motorcycle.

In many cases, the attempt of the motorcycle's rider to avoid a collision will result in either a crash or in losing control over the motorcycle. This situation is dangerous to all vehicles in the vicinity, and has often resulted in fatal automobile accidents.

Failure to notice a motorcycle or any other vehicle which is approaching from the rear side, can occur relatively often and even when the front light of the motorcycle is switched on. Additional conditions—such as, when the motor vehicle windows are closed and the heater or the air condition is on, and the radio is also on with the windows closed—increases the isolation of the motor vehicle drivers and as a result, motorcycles are becoming more and more invisible. Additionally, excessive stimulations diminish the ability of the driver to pay attention to hardly noticeable vehicles approaching from the rear side.

Various methods for detecting other adjacent motor vehicles have been previously offered. For example, U.S. Pat. No. 6,150,931 discloses a mobile unit detection system or information system. In this system, the existence of a car or other mobile unit can be detected only upon receiving a necessary signal. However, when a motor vehicle intends to change lanes and a motorcycle arrives from behind, the rider of the motorcycle is unable to determine whether or not he had been noticed by the driver of the motor vehicle. Since U.S. Pat. No. 6,150,931 determines that its mobile unit "may transmit a response signal upon receiving the detection" the driver of the motorcycle can only assume that the driver of the motor vehicle—that intends to make a turn—had sensed his movement straight ahead. In this case, the operation of vehicles becomes speculative. Moreover, the system proposed by this patent, as with other similar publications, overloads the drivers with excessive and complex information. Therefore, what is needed is a simple notification that would not deviate the driver's attention and that addresses the above-identified concerns regarding such situations. In particular, there is a need for a reciprocal vehicle safety and warning system that is capable of notifying the driver of a motor vehicle whenever there is a motorcycle that is approaching from the rear side of his motor vehicle and in exchange involuntarily, automatically and independently of protocol communication notifying the motorcycle's rider that he had been noticed and as a result, it is safe to proceed.

Therefore, the general aim of the present invention is to provide a safe noticeable cross-over of the motor vehicle between lanes and a safe overtaking of the motorcycle approaching from the rear side of the motor vehicle.

Another object of the present invention is to provide a new, simple and safer system for warning concurrently both drivers, the driver of the motor vehicle and the rider of the motorcycle that is approaching from behind.

Still another important objective of the invention is to provide the driver of the motor vehicle with an indication of the direction from which the motorcycle approaching from the rear side proceeds, either from its left or right rear side.

Yet, another object of the present invention is to provide the driver of the motorcycle with remote indication whether the driver of the motor vehicle has been alerted regarding his approach.

These and other objectives and advantages of the invention will become more apparent from the following detailed description when taken in conjunction with the accompanying drawings.

SUMMARY OF THE INVENTION

The present invention is directed to a vehicle awareness system that provides a warning to the driver of a motor vehicle having an inside alert system about a motorcycle approaching from his rear side, and a visual signaling unit indicating that an alert has been generated to the rider of the motor vehicle approaching from the rear.

The present invention relates to a vehicle awareness system for alerting the driver of a motor vehicle the approaching from the rear side of a motorcycle, and for reporting to the rider of the motorcycle that the driver of the motor vehicle has been alerted, which comprises:

a) a motorcycle unit, located on the motorcycle, for transmitting signals toward the traveling lane of that motorcycle;

b) a car unit, located in the motor vehicle, for receiving signals transmitted from the motorcycle unit, and accordingly supplying one or more output signals indicative of the approach of the motorcycle;

c) first warning means, activated by the output signals, for alerting the driver of the motor vehicle regarding the approach of the motorcycle from the rear side; and d) second warning means, activated by the same output signals, for signaling the driver of the motorcycle that the first warning means are active.

The first warning means may be one or more visual indicators, audible indicator or combination of both. Preferably, the first warning means is associated with the face of the rearview mirror of the motor vehicle, wherein the one or more visual indicators are at least two markers, providing the driver of the motor vehicle with visual directional notification of the presence and location of the motorcycle.

The second warning means may be a visual indicator, located on the rear side of the motor vehicle, facing the driver of the motorcycle.

DETAILED DESCRIPTION OF PREFERRED EMBODIMENTS

In the following detailed description, numerous specific details are presented in order to provide a thorough understanding of the invention. However, it will be understood by those knowledgeable in the field that the present invention may be practiced without these specific details. In some instances, well-known methods, procedures, components and circuits have not been described in detail, for the sake of brevity.

The term "motorcycle" refers herein to a vehicle approaching from the rear side of other vehicle, such as a motorcycle, motorbike or any other vehicle which is relatively small and moving relatively faster than the vehicle ahead of it.

The term "motor vehicle" refers herein to any type of vehicle, such as a car, a private automobile, a truck, a bus, etc.

The present invention relates to a system for alerting the driver of a motor vehicle of a motorcycle approaching from its rear side, and for reporting or signaling the driver of the motorcycle, that the driver of the motor vehicle has been alerted.

According to a preferred embodiment of the present invention, the vehicle awareness system of the invention comprises two main units: a Motorcycle unit (hereinafter MC unit) located on the motorcycle and a Car Unit (hereinafter CU) located on the motor vehicle.

Figure 1:
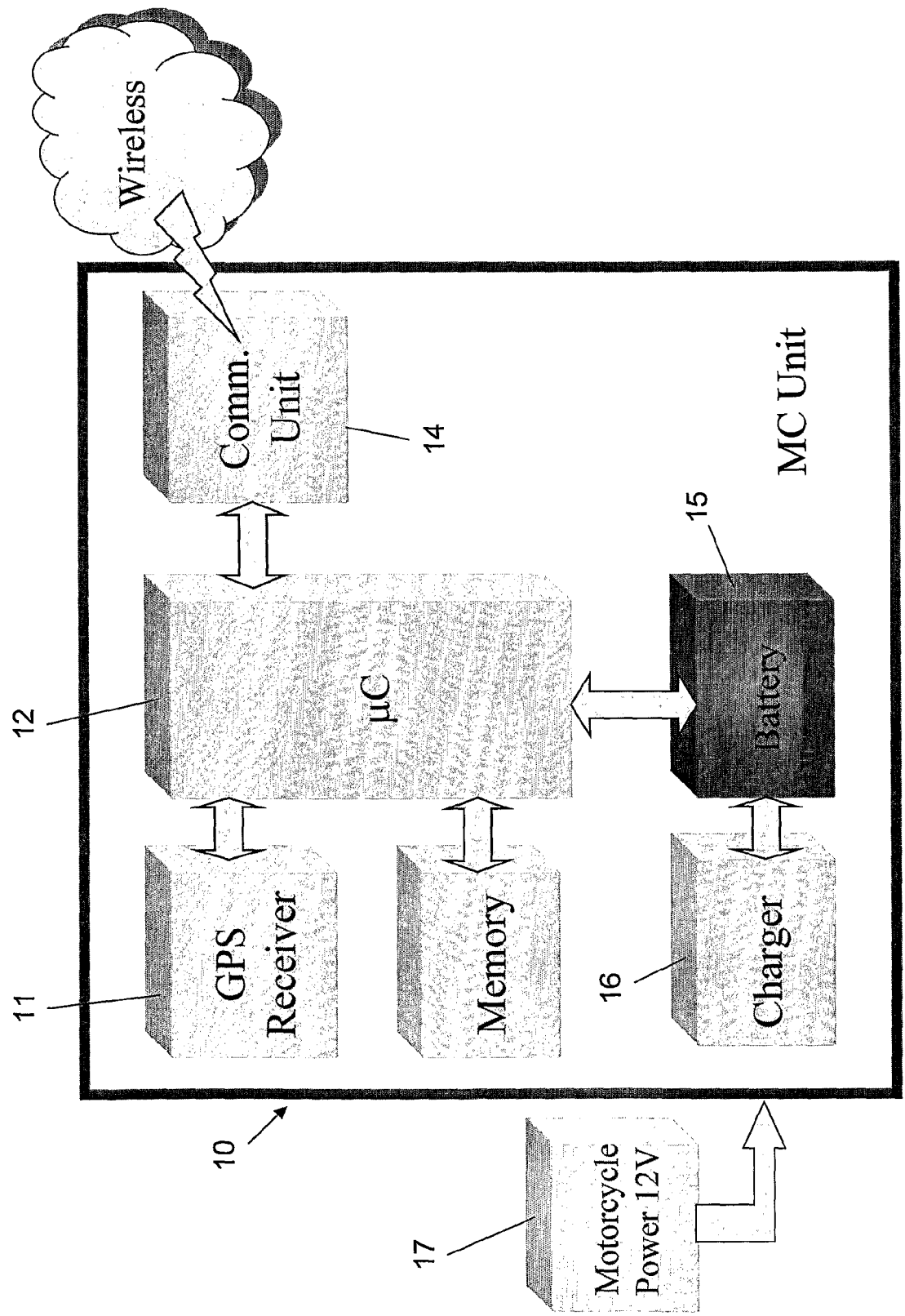
FIG. 1 is a block diagram which schematically illustrates the motorcycle unit of a vehicle awareness system, according to one embodiment of the present invention.

FIG. 1 is a block diagram which schematically illustrates a MC unit (10) of the vehicle awareness system, according to an embodiment of the present invention. The MC unit (10) is used for transmitting one or more signals to the motor vehicles in front or a head of it, in order to warn the drivers of these motor vehicles regarding the approach of a motorcycle behind them.

The MC unit (10) comprises: a Global Positioning System (GPS) receiver (11), processing means, such as microprocessor (12) and a memory device (13), a transmitter (14) and electric power means, such as a battery (15). Alternatively, the MC unit (10) can be connected directly to the motorcycle power source (17), and it may also include a charger (16) for charging the battery (15).

Figure 2:
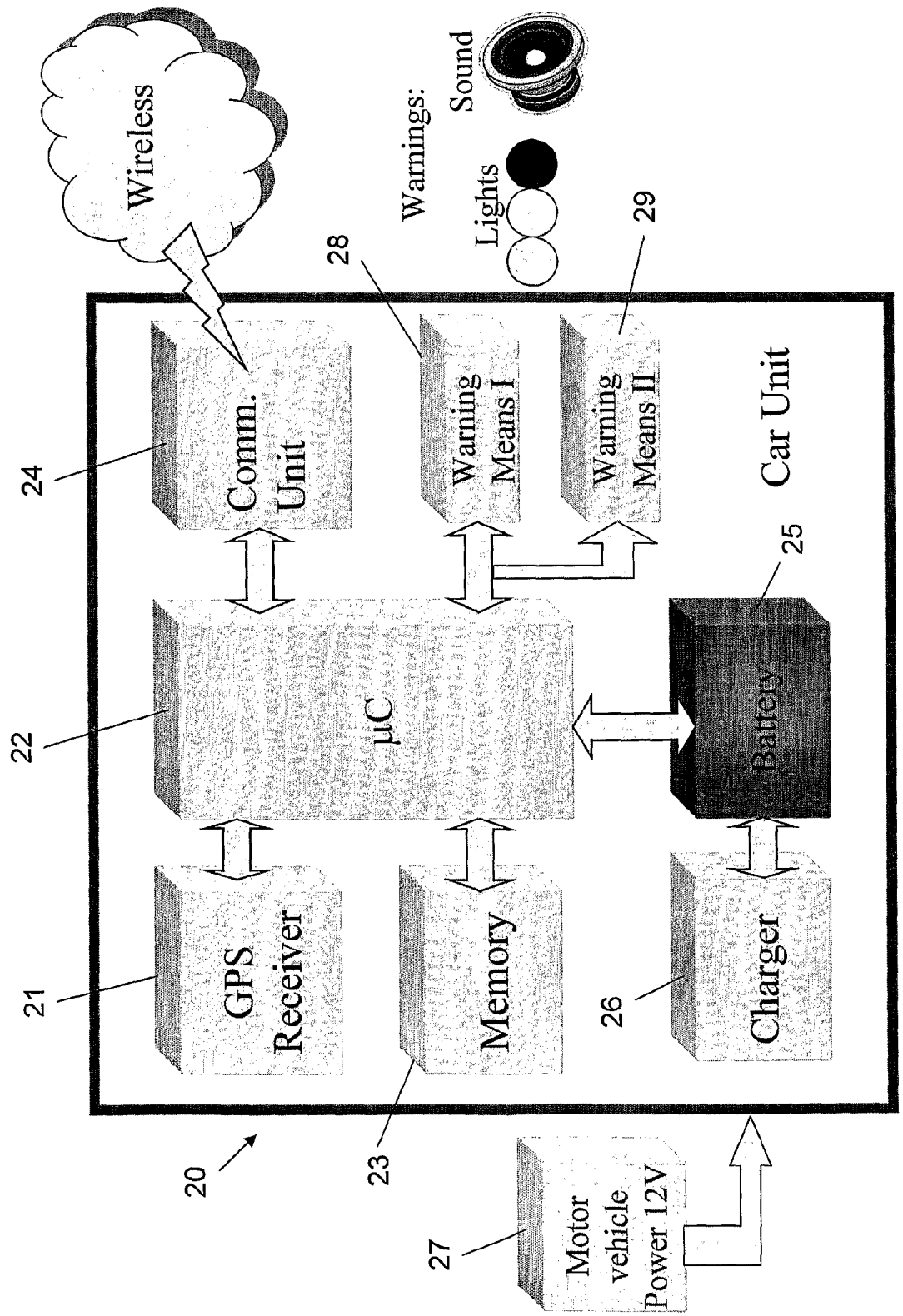
FIG. 2 is a block diagram which schematically illustrates the car unit of a vehicle awareness system, according to one embodiment of the present invention.

FIG. 2 is a block diagram which schematically illustrates a Car Unit (20) of the vehicle awareness system, according to an embodiment of the present invention. The CU (20) is used for receiving the signals transmitted from the MC unit (10) of a motorcycle approaching from its rear side, and accordingly to generate warning signals to the driver of the motor vehicle and to the driver of the motorcycle. The CU (20) comprises a GPS receiver (21), processing means, such as a microcontroller (22) and a corresponding memory device (23), a receiver (24), a first warning means (28) for alerting the driver of the motor vehicle, a second warning means (29) for signaling the driver of the motorcycle, and an electric power means, such as a battery (25). Alternatively, the CU (20) can be connected directly to the motor vehicle power source (27), and it may also include a charger (26) for charging the battery (25).

Figure 3:
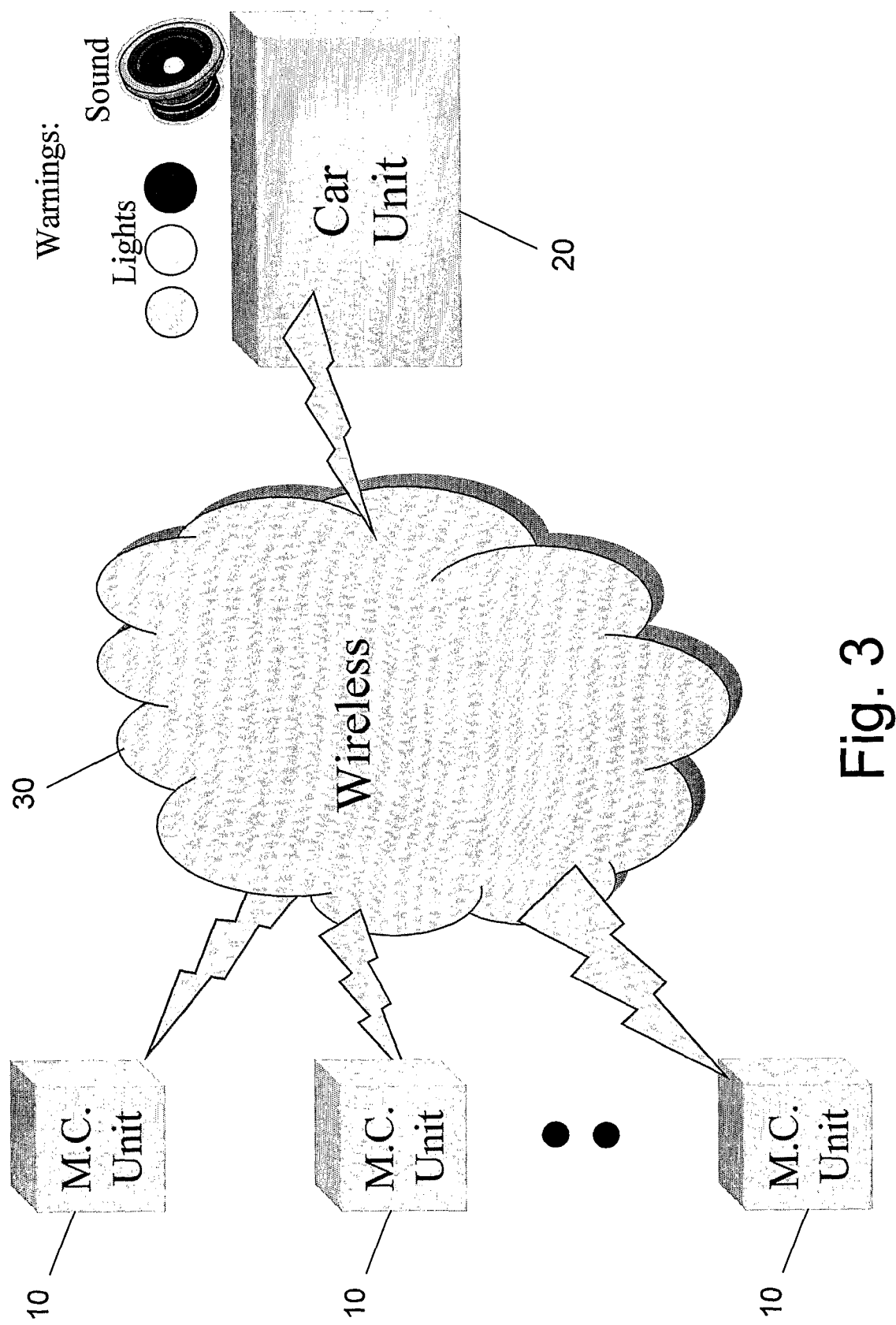
FIG. 3 schematically illustrates the communication network of the vehicle awareness system, according to one preferred embodiment of the present invention.

The MC unit (10) wirelessly transmits signals towards motor vehicles currently positioned ahead of it, via the transmitter (14) (the wireless network is represented by element (30) in FIGS. 1 to 3). The signals transmitted from the MC unit (10) represent the approach of the motorcycle to the motor vehicles ahead of it, while the CU (20) being responsive to the signals received from the MC unit (10).

FIG. 3 schematically illustrates the communication network of the awareness system, according to one embodiment of the present invention. The awareness system of the invention operates as follows:

Every MC unit (10) transmits one or more parameters, such as its position, velocity and unique ID. These parameters are received from the GPS receiver (11);

The Car unit (20) receives data from every MC unit (10) in range;

The Car unit (20) calculates relative velocity, crossing time and crossing direction for each MC unit (10). For example, these calculations are based on known kinematical equations for speed, direction and relative position, as are known in the art; and Warning means (28), (29) are activated according to predefined thresholds of crossing direction, crossing time and distance between vehicles (i.e., between motorcycle and motor vehicle). The warning means can be in the form of lights and/or sounds (as schematically illustrated in FIG. 2 and FIG. 3).

Preferably, but not limitatively, there can be more than one warning level. For example, there can be three warning levels, such as OK (currently, no motorcycle is present within range of the system), medium (a motorcycle is presently within range, but is driving relatively slowly, or it is still relatively far), high (beware, a motorcycle is approaching you fast, or it intend to overtake you within a few seconds). The different warning levels depend on the aforementioned parameters (i.e., the distance between vehicle, velocity etc) and whether there is a motorcycle presence within range.

As aforementioned, the CU (20) is used for processing the received signals from the MU (10) (i.e., by its processing means) and to produce responsive output of audible and/or visual indicator regarding the approaching of a motorcycle from the rear side, as well as an additional visual indicator (e.g., in form of a rear light) to the driver of the motorcycle.

As described hereinabove, the warning means (28) and (29) are activated by the output signal from the microcontroller (22). The first warning means (28) is used for alerting the driver of the motor vehicle regarding the approaching of motorcycle from the rear side. The second warning means is also activated by the output signal from microcontroller (22), and are used for signaling the driver of the motorcycle that the first warning means is active (i.e., the driver of the motor vehicle has been alerted regarding his approach).

Figure 4:
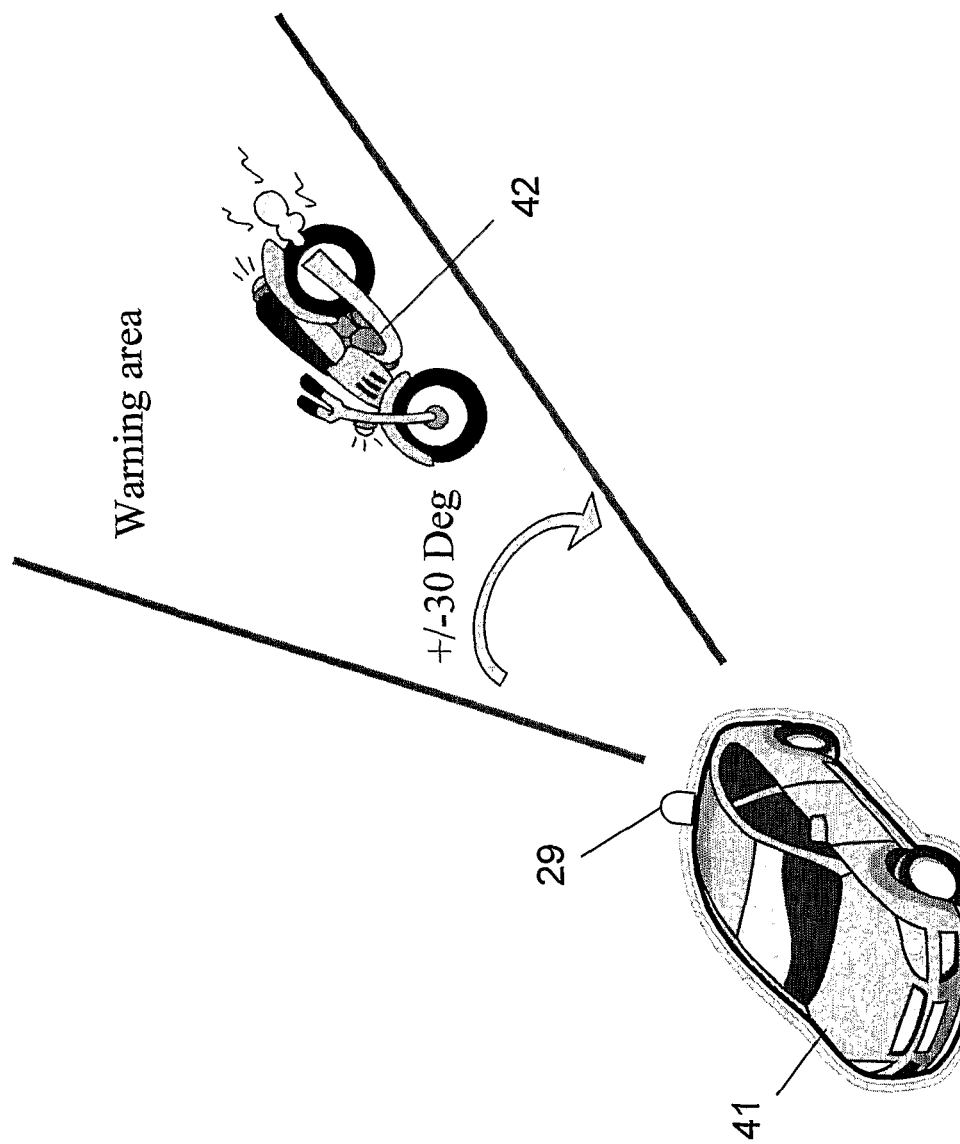
FIG. 4 schematically illustrates the operation of the vehicle awareness system, according to a preferred embodiment of the present invention.

FIG. 4 schematically illustrates the operation of the vehicle awareness system, according to a preferred embodiment of the present invention. Preferably, the optimal warning area of the system is (in virtually??) created by an angle of −30° to +30° from the rear side of the motor vehicle (41), as shown in the figure. Therefore, motorcycle (42) is detected only when it is located within that range.

Preferably, the second warning means (29) is located at the rear end of the motor vehicle, in such a way that it faces the driver of the motorcycle. For example, the second warning means (29) can be located on the rear window of the motor vehicle (41) (shown in FIG. 4), the rear lights panel, or on the roof of the motor vehicle (41). Of course, the second warning means (41) can be located on the motor vehicle 41 and warned the driver of the motorcycle (42) (shown in FIG. 4) via other suitable ways.

Displaying the alert information to the driver of the motor vehicle regarding the approach of a motorcycle from the rear side, can be done in several ways. According to one embodiment of the invention, the first warning means (28) can be a visual indicator, an audible indicator or a combination of both. Preferably, the first warning means (28) are located inside the motor vehicle (41). For example, the first warning means (28) can be incorporated onto the face of the rearview mirror (51) of the motor vehicle (41) (as shown in FIG. 5).

According to one embodiment of the present invention, the visual indicators may include two or more markers (e.g., located on the face of a the rearview mirror (51)) that are responsive to the output signal from microcontroller (22) to provide the driver of the motor vehicle (41) with visual directional notification of the presence and location of the motorcycle (42). For example, the indicator can normally be either invisible or visually muted, and can be individually illuminated responsive to the output signal from microcontroller (22).

Figure 5:
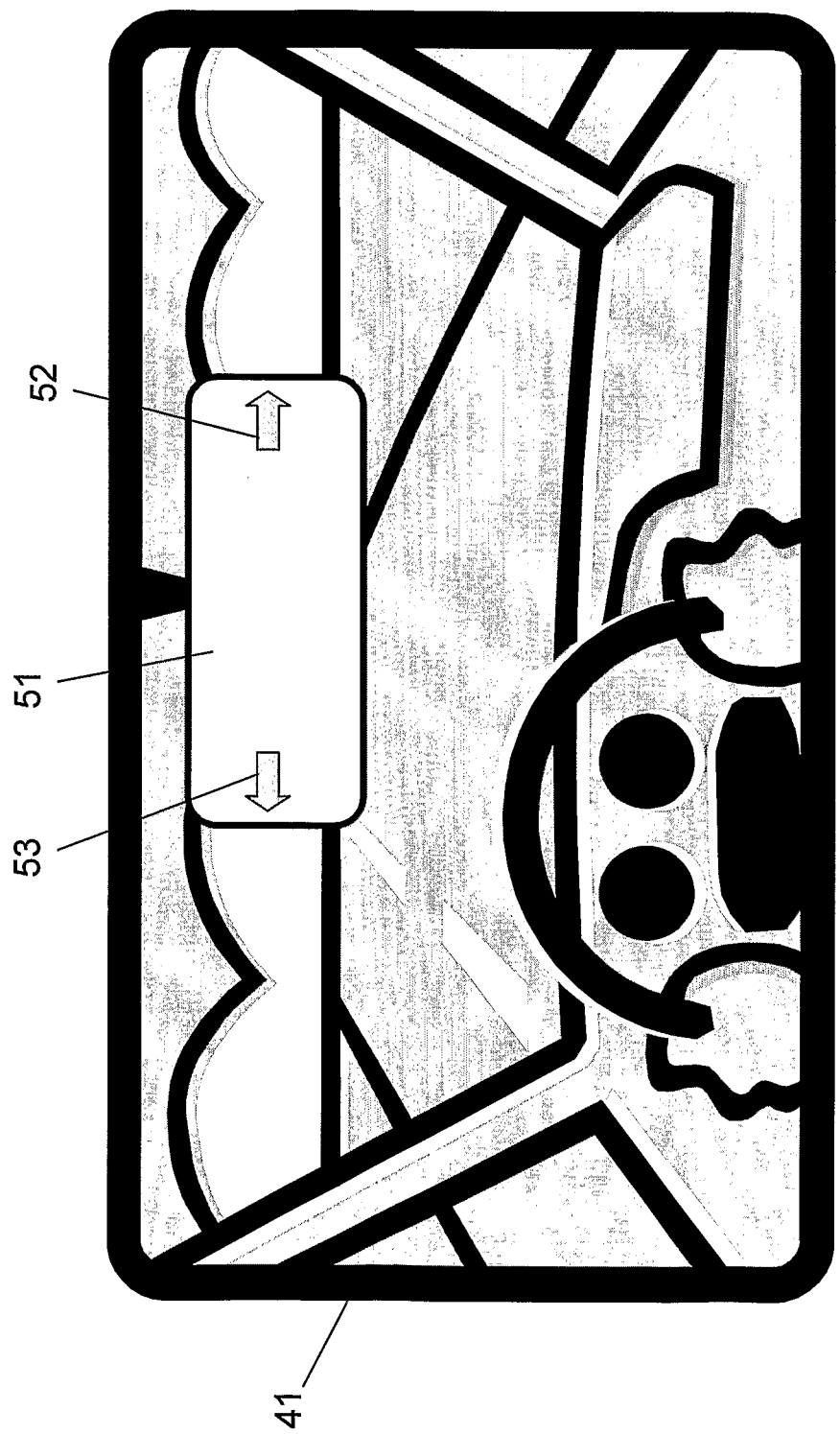
FIG. 5 schematically illustrates an inside view of a motor vehicle, according to one preferred embodiment of the present invention.

Depending on the direction from which the signals from the MC unit (10) arrives at the CU (20), the aforementioned indicator markers may include, left pointer (52) and right pointer (53) (as shown in FIG. 5), responsive to output signals associated with motorcycle (42). These pointers (52), (53) indicate, more specifically, if the motorcycle (42) is approaching either from the left, or the right side of motor vehicle (41) or, in the case of more than one motorcycle, from both sides.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A vehicle awareness system for alerting the driver of a motor vehicle of a motorcycle approaching from the rear side, and for reporting to the driver of said motorcycle that the driver of said motor vehicle has been alerted, wherein the alert indicates the side from which said motorcycle approaching said motor vehicle, and thereby it allows a safe noticeable cross-over of said motor vehicle between lanes said system comprising:

a) a motorcycle unit (MC unit), located on said motorcycle, for transmitting signals toward its traveling lane;

b) a car unit (CU), located in said motor vehicle, for receiving signals transmitted from said MC unit, and accordingly supplying one or more output signals indicative of the crossing direction, speed and distance of said motorcycle;

c) first warning means in the form of one or more visual indicators, an audible indicator or a combination thereof, activated by said output signals, for alerting the driver of said motor vehicle regarding the approach of said motorcycle either from its left or right side; and d) second warning means, activated by said output signals, for signaling the driver of said motorcycle that said first warning means are active.

2. A system according to claim 1, in which the first warning means is associated with the face of the rearview mirror of the motor vehicle.

3. A system according to claim 1, in which the one or more visual indicators are at least two markers which provide the driver of the motor vehicle with visual directional notification of the presence and location of the motorcycle, thereby notifying said driver whether said motorcycle approaches either from its left or right side.

4. A system according to claim 1, in which the second warning means is a visual indicator, located on the rear side of the motor vehicle, facing the rider of the motorcycle.

* * * * *